(12) United States Patent
Kawamura et al.

(10) Patent No.: US 8,253,291 B2
(45) Date of Patent: Aug. 28, 2012

(54) AIR-CORE STEPPING MOTOR AND SHAFT SUPPORT STRUCTURE

(75) Inventors: Kenji Kawamura, Nagano (JP); Tsutomu Naitou, Kanagawa (JP)

(73) Assignee: Sony Corporation (JP)

( * ) Notice: Subject to any disclaimer, the term of this patent is extended or adjusted under 35 U.S.C. 154(b) by 216 days.

(21) Appl. No.: 12/661,903

(22) Filed: Mar. 25, 2010

(65) Prior Publication Data

US 2011/0057521 A1    Mar. 10, 2011

(30) Foreign Application Priority Data

Mar. 25, 2009 (JP) ................ P2009-074037

(51) Int. Cl.
*H02K 5/16* (2006.01)
*F16C 25/00* (2006.01)
(52) U.S. Cl. ............ 310/90; 348/517; 348/542
(58) Field of Classification Search ........ 310/90; 384/448, 477, 504, 505, 512, 517, 526, 535–537, 384/542, 609, 615
See application file for complete search history.

(56) References Cited

U.S. PATENT DOCUMENTS

| | | | | |
|---|---|---|---|---|
| 3,610,714 A | * | 10/1971 | De Gaeta | 384/425 |
| 3,900,232 A | * | 8/1975 | Rode | 384/517 |
| 4,480,881 A | * | 11/1984 | Fujimori | 310/90 |
| 4,895,461 A | * | 1/1990 | Stella | 384/454 |
| 7,375,446 B2 | * | 5/2008 | Suzuki et al. | 310/86 |
| 7,456,536 B2 | * | 11/2008 | Tanaka et al. | 310/90 |
| 7,564,154 B2 | * | 7/2009 | Reuter | 310/90 |
| 7,667,361 B2 | * | 2/2010 | Nobe et al. | 310/90 |
| 2004/0135448 A1 | * | 7/2004 | Matsushita et al. | 310/90 |

FOREIGN PATENT DOCUMENTS

JP    2006-211919 A    8/2006

* cited by examiner

*Primary Examiner* — Tran Nguyen
(74) *Attorney, Agent, or Firm* — Lerner, David, Littenberg, Krumholz & Mentlik, LLP

(57) ABSTRACT

An air-core stepping motor includes: a tubular stator including a yoke and a coil; a tubular rotor including a cylindrical magnet; and rotor support means for supporting the rotor rotatably with respect to the stator, the rotor support means including a sleeve fixed to the rotor, a holder fixed to the stator, and a ball held between the sleeve and the holder, the holder having a first holder member and a second holder member separated in a rotational-axial direction of the motor, the first holder member and the second holder member being assembled with the first holder member or the second holder member fitted to the sleeve, and being used thereafter with the first holder member or the second holder member disconnected from the sleeve.

7 Claims, 3 Drawing Sheets

AIR-CORE STEPPING MOTOR AND SHAFT SUPPORT STRUCTURE

CROSS-REFERENCE TO RELATED APPLICATION

The present application claims priority from Japanese Patent Application No. JP 2009-074037 filed in the Japanese Patent Office on Mar. 25, 2009, the entire content of which is incorporated herein by reference.

BACKGROUND OF THE INVENTION

1. Field of the Invention

The present invention relates to an air-core stepping motor using a hollow rotor. More particularly, the invention relates to an air-core stepping motor having a novel shaft support structure.

2. Description of the Related Art

The present inventor has proposed a method of supporting a rotor rotatably with respect to a stator in an air-core stepping motor by arranging a plurality of shafts, extending in the axial direction, along the outer periphery of the stator, and a plurality of rollers rotatably fitted to the shafts, and causing the rollers to roll in contact with the outer surface of the rotor to thereby support the rotor (see JP-A-2006-211919 (Patent Document 1)). This method is cheaper than commercially available bearings, and can make the air-core stepping motor lighter. Further, the method has an advantage such that the shafts if provided with radial elasticity can absorb run-out and make the rotation of the rotor smoother.

SUMMARY OF THE INVENTION

It is desirable to provide an air-core stepping motor or the like with a shaft support structure having advantages such that the hysteresis (shaft loss) is small, dimensions can be set freely, the motor can be made thinner, and the coaxiality to the rotating shaft of the rotor can be made accurate.

An air-core stepping motor according to an embodiment of the present invention includes a tubular stator including a yoke and a coil, a tubular rotor including a cylindrical magnet, and rotor support means for supporting the rotor rotatably with respect to the stator, wherein the rotor support means includes a sleeve fixed to the rotor, a holder fixed to the stator, and a ball held between the sleeve and the holder, the holder has a first holder member and a second holder member separated in a rotational-axial direction of the motor, and the first holder member and the second holder member are assembled with the first holder member or the second holder member fitted to the sleeve, and are used thereafter with the first holder member or the second holder member disconnected from the sleeve.

According to the embodiment of the invention, a sleeve equivalent to the inner ring of a general bearing can be formed as a part of the rotor or an extension member thereof, so that the air-core stepping motor can be made thinner (the axial thickness can be made smaller) than can be achieved by commercially available bearings, and can be placed in a smaller space. Although the dimensions of the commercially available bearings are somewhat determined, the dimensions of the sleeve according to the invention can be set according to the size of the motor. Further, the air-core stepping motor is cheaper than a motor whose bearing of a special size is custom-made by a maker.

Because the holder members are fixed to each other with the sleeve fitted inside the first holder member and the second holder member, the holder members and the sleeve can be coaxially positioned. Further, assembly of the rotor support means and attachment of the means to the rotor can be carried out at the same time.

According to one embodiment of the invention, it is preferable that ball holding surfaces of the first holder member and the second holder member are tapered surfaces which become wider toward an inside diameter side and face each other, and the first holder member and the second holder member are fixed with a preload applied in the rotational-axial direction.

The looseness between the ball and each holder member can be made smaller or eliminated by fixing both holder members with a preload applied in the rotational-axial direction.

According to an embodiment of the invention, the sleeve can be provided with a flange portion extending toward an outside diameter, the flange portion can be fitted to the first holder member or the second holder member at a time of coaxial positioning to assemble the first and second holder members and the sleeve, and after assembling, the fixed first holder member and the second holder member can be disengaged from the flange portion in an axial direction.

When the fixed first holder member and the second holder member are disengaged from the flange portion in an axial direction after assembling, the sleeve and the holder can be made rotatable via the ball. In this case, the coaxiality of the sleeve and the holder can be maintained via the ball. The flange portion may work as a fall-off preventing projection in the axial direction after assembling.

An air-core stepping motor according to a specific mode of the invention includes a tubular stator including a yoke and a coil, and a housing the yoke and coil accommodated therein, a tubular rotor including a cylindrical magnet and a cylindrical back yoke, which are arranged on an inner periphery side of the stator, and rotor support means for supporting the rotor rotatably with respect to the stator, wherein the rotor support means includes a sleeve fixed in such a way as to extend from both axial-directional end portions of the back yoke of the rotor in an axial direction, and provided with a flange portion extending outward, a holder fixed to both axial-directional end portions of the yoke of the stator, and having a first holder member and a second holder member separated in the axial direction, opposite surfaces of the first holder member and the second holder member being tapered surfaces which become wider toward an inside diameter side and face each other, and a ball held between the sleeve and the both tapered surfaces of the holder, the first holder member and the second holder member are assembled with the first holder member or the second holder member fitted to the flange portion of the sleeve, and are used thereafter with the first holder member or the second holder member disconnected from the sleeve.

A shaft support structure according to an embodiment of the invention includes a tubular fixing part, a tubular rotary body arranged coaxial to the fixing part on an outer periphery or inner periphery of the tubular fixing part, and being supported rotatably with respect to the fixing part, a sleeve fixed to the rotary body, a holder fixed to the fixing part, and a ball held between the sleeve and the holder, wherein the holder has a first holder member and a second holder member separated in a rotational-axial direction, the first holder member and the second holder member are assembled with the first holder member or the second holder member fitted to the sleeve, and are used thereafter with the first holder member or the second holder member disconnected from the sleeve.

As apparent from the foregoing description, according to the embodiments of the invention, a sleeve equivalent to the inner ring of a general bearing can be formed as a part of the rotor or an extension member thereof, so that the air-core stepping motor can be made thinner (the axial thickness can be made smaller) than can be achieved by commercially available bearings, thus providing a motor with the shaft support structure, which can be placed in a smaller space. In addition, the dimensions of the sleeve and holder can be set according to the size of the motor in use. Further, the air-core stepping motor can be manufactured at a lower cost than a motor whose bearing of a special size is custom-made by a maker.

DETAILED DESCRIPTION OF THE INVENTION

An embodiment of the present invention will be described in detail below with reference to the accompanying drawings.

Figure 1:
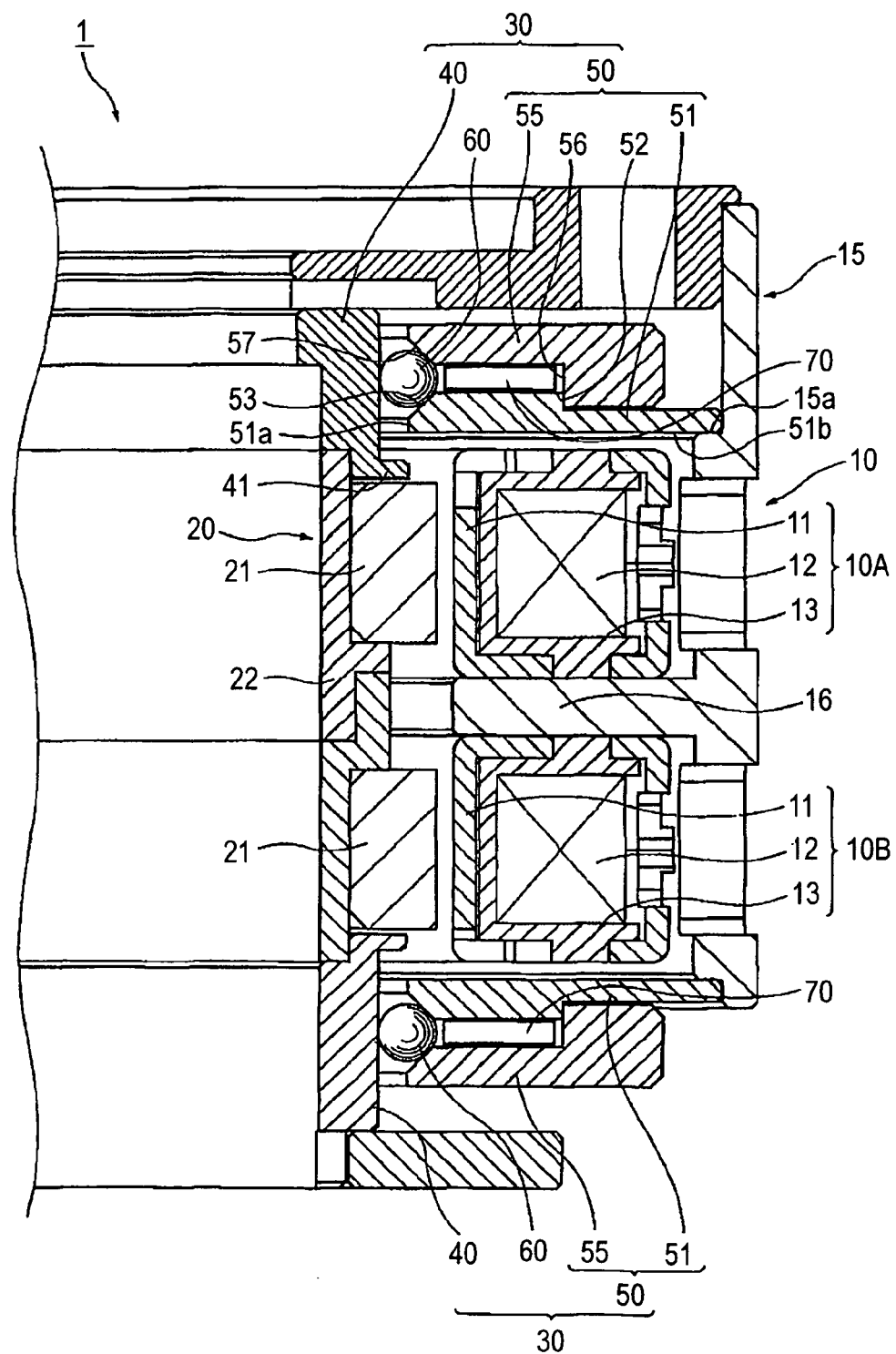
FIG. 1 is a side cross-sectional view showing the configuration of an air-core stepping motor according to an embodiment of the invention.

As shown in FIG. 1, an air-core stepping motor 1 includes a tubular stator 10, a tubular rotor 20 disposed at the inner periphery of the stator 10, and a support assembly (support means) 30 which supports the rotor 20 rotatably with respect to the stator 10.

The stator 10 has an A-phase stator 10A and a B-phase stator 10B aligned in the axial direction and accommodated in a housing 15. Each stator 10A, 10B has two claw-pole magnetic pole pieces 11 and a coil 12. The magnetic pole piece 11 has a flat ring portion, and a plurality of triangular pole teeth extending from the inner peripheral edge of the ring portion in the rotational-axial direction. The two magnetic pole pieces 11 are disposed in such a way that their pole teeth face each other and engage with each other in a non-contact manner, with a coil retaining recess formed between the two magnetic pole pieces 11. Those magnetic pole pieces 11 are fixed together by a bobbin 13. The bobbin 13 is molded of a resin covering the outer surface of the coil retaining recess of each stator 10A, 10B and filled between the pole teeth. A copper wire is wound to form the coil 12 in each coil retaining recess covered with the bobbin 13. Each coil 12 is insulated from the respective magnetic pole piece 11 by the bobbin 13.

The housing 15 is a cylindrical member having a partition wall part 16 formed near the center of the inner surface thereof and extending inward. The individual stators 10A, 10B are disposed in such a way that the pole teeth of the magnetic pole pieces 11 are shifted by ½ pitch in the circumferential direction, and are accommodated side by side in the axial direction with the partition wall part 16 in between.

The rotor 20 has cylindrical magnets 21 arranged in opposite to the inner surfaces of the A-phase stator 10A and the B-phase stator 10B, and a cylindrical back yoke 22 to which the inner surfaces of both magnets 21 are fixed. The back yoke 22 has a pair of back yoke pieces separated into two in the axial direction. Both back yoke pieces are fixed together by, for example, an adhesive.

Next, the support assembly 30 which supports the rotor 20 rotatably with respect to the stator 10 (housing 15) will be described.

The rotor support assembly 30 has a sleeve 40 fixed to the rotor 20, a holder 50 fixed to the stator 10, balls 60 held between the sleeve 40 and the holder 50, and a retainer which holds the balls 60 at proper circumferential positions.

The sleeve 40 is fixed in such a way as to extend from both axial-directional end faces of the back yokes 22 of the rotor 20 in the axial direction. A flange portion 41 extending toward the outside diameter side is formed at the rotor-side end portion of the outer surface of the sleeve 40.

The holder 50 is fixed to both axial-directional end faces of the housing 15 accommodating the stator 10. The holder 50 has a first holder member 51 and a second holder member 55 separated in the axial direction. The first holder member 51 is arranged inside in the axial direction (on the stator 10 side), and the second holder member 55 is arranged outside in the axial direction.

The first holder member 51 is a flat ring-shaped member whose inner periphery 51a has a diameter equal to the outside diameter of the flange portion 41 of the sleeve 40. The first holder member 51 has a thick portion on the inner periphery side and a thin portion on the outer periphery side, with a step portion 52 formed therebetween. The outer corner of the inner surface in the axial direction is a tapered surface 53. The taper angle is about 45 degrees in this example. The first holder member 51 has a flat surface 51b opposite to the step portion. The flat surface 51b is in contact with an axial-directional end face 15a of the housing 15. The first holder member 51 is securely connected to the housing 15 by means of an adhesive, press fitting or the like.

The second holder member 55 is likewise a flat ring-shaped member whose inside diameter is equal to the outside diameter of the flange portion 41 of the sleeve 40. The second holder member 55 has a thin portion on the inner periphery side and a thick portion on the outer periphery side, with a step portion 56 formed therebetween. The diametrical length of the thin portion is equal to the diametrical length of the thick portion of the first holder member 51. The height (axial length) of the step portion 56 is higher than the height of the step portion 52 of the first holder member 51. The inner corner of the inner surface of the second holder member 55 in the axial direction is a tapered surface 57. The taper angle, which is the same as the taper angle of the tapered surface 53 of the first holder member 51, is about 45 degrees in this example.

The second holder member 55 is engaged with the first holder member 51 in such a way that their step portions 56, 52 engage with each other. The axial-directional outer side of the thin portion of the first holder member 51 and the axial-directional inner side of the thick portion of the second holder member 55 are fixed together by an adhesive or the like. At the time of fixing them, there is a clearance between the thick portion of the first holder member 51 and the thin portion of the second holder member 55 because of the difference in height between the step portions 52, 56 of both holder members 51, 55 as mentioned above.

The tapered surface 53 of the first holder member 51 faces the tapered surface 57 of the second holder member 55, and space which becomes wider toward the inside diameter side is formed therebetween.

Figure 2:
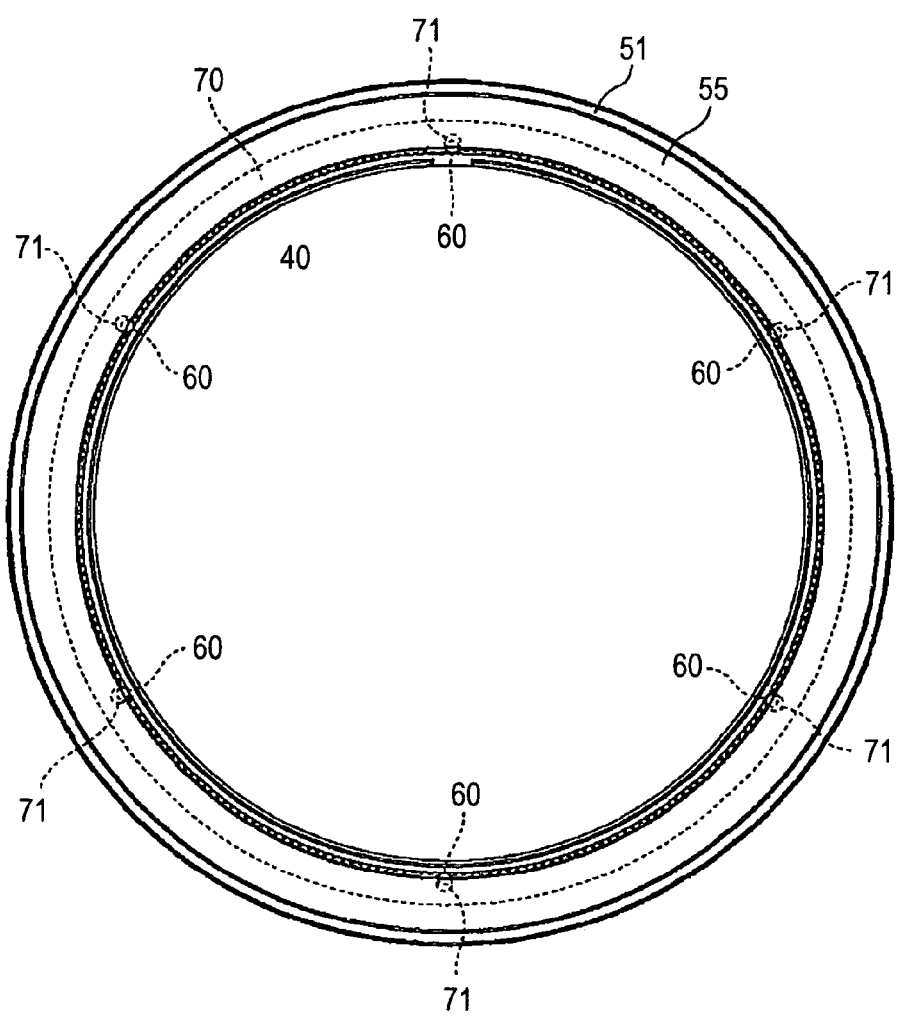
FIG. 2 is a plan view showing the structure of a retainer to be mounted to a rotor.

The balls 60 are made of steel, and are held between the tapered surfaces 53, 57 formed at the inner surfaces of the first and second holder members 51 and 55, and the outer surface of the sleeve 40. In consideration of the balance and hysteresis (rattling) at the time of rotation, the number of balls 60 needed is at least three. In this example, six balls 60 are arranged in the circumferential direction at equal central angles. The balls 60 are held by the retainer 70 in such a way as not to be shifted in the circumferential direction. As shown in FIG. 2, the retainer 70 is a thin ring-shaped member, and has notches 71 formed in the inner surface at predetermined positions (at six locations arranged in the circumferential direction at equal central angles in the example) for holding the balls 60. The retainer 70 is retained in the clearance between the thick portion of the first holder member 51 and the thin portion of the second holder member 55.

When the coils 12 are energized to rotate the rotor 20, the balls 60 roll in contact on the outer surface of the sleeve 40 to support the rotor 20. The balls 60 are held between the tapered surfaces 53, 57 of the holder members 51, 55 in such a way as not to be movable in the axial direction, and are also held by the retainer 70 in such a way as not to be movable in the circumferential direction. As apparent from the above, because the sleeve 40 equivalent to the inner ring of a general bearing is formed as an extension member of the rotor 20, the air-core stepping motor can be made thinner (the axial thickness can be made smaller) than can be achieved by commercially available bearings, and the motor can be placed in a smaller space. In addition, the dimensions of the sleeve 40 and the holder 50 can be set according to the size of the motor in use.

Next, one example of a method of assembling the rotor support assembly 30 will be described.

Figure 3A:
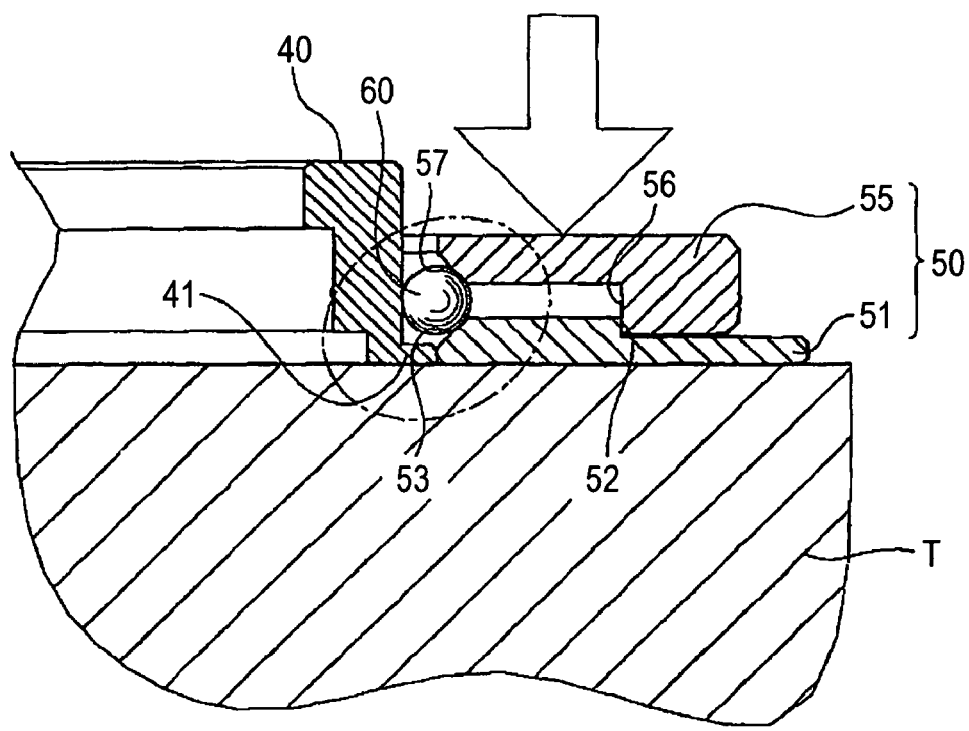
FIGS. 3A and 3B are diagrams for explaining how to assemble a rotor support assembly.
Figure 3B:
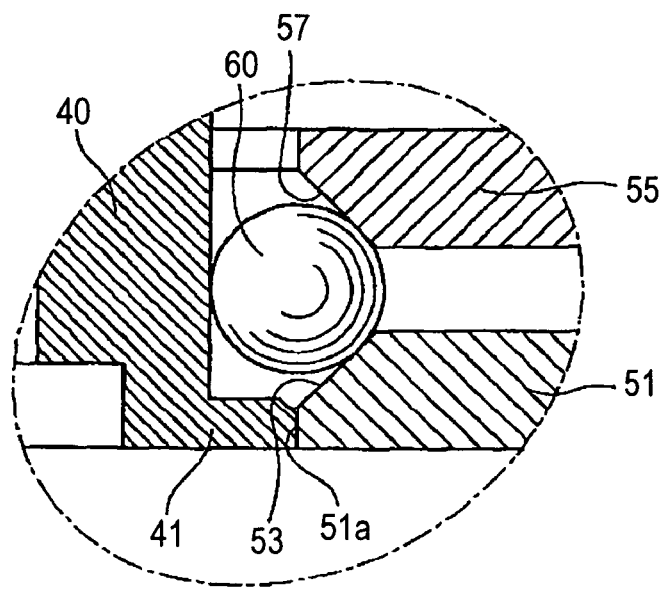

FIGS. 3A and 3B are diagrams for explaining how to assemble the rotor support assembly 30.

At the time of assembling the rotor support assembly 30, the holder 50 and the balls 60 are attached to a single sleeve 40 (which is not fixed to the rotor 20).

First, as shown in FIG. 3A, the sleeve 40 is placed, with the flange portion 41 facing downward, on a surface plate T. Then, the inner periphery 51a of the first holder member 51 is fitted into the outer periphery of the flange portion 41. Because the outside diameter of the flange portion 41 and the diameter of the inner periphery 51a of the first holder member 51 are substantially equal to each other, both are fitted tightly, causing the flange portion 41 and the first holder member 51 to be arranged coaxially. Thereafter, the retainer (not shown in FIGS. 3A and 3B) is mounted on the thick portion of the first holder member 51, and the balls 60 are placed in the respective notches of the retainer. The balls 60 are held between the outer surface of the sleeve 40 and the tapered surface 53 of the first holder member 51.

Next, the step portion 56 of the second holder member 55 is engaged with the step portion 52 of the first holder member 51. As a result, as shown in enlargement in FIG. 3B, the balls 60 are held between the outer surface of the sleeve 40 and the tapered surfaces 53, 57 of the first and second holder members 51 and 55. Then, a preload is applied to the second holder member 55 from above to adhere and fix the first holder member 51 and the second holder member 55. As the first holder member 51 and the second holder member 55 are fixed with a preload applied in this manner, rattling of the balls 60 in the axial direction can be eliminated.

A description will now be given of how to attach the rotor support assembly 30, assembled in the above manner, to the stator 10 and the rotor 20.

The end portion of the sleeve 40 of the rotor support assembly 30 is fixed to the end portion of the outer yoke 22 of the rotor 20 as mentioned above, so that the first holder member 51 is fixed to the end face of the housing 15. At this time, as shown in FIGS. 3A and 3B, the first holder member 51 is fitted to the flange portion 41 of the sleeve 40 in the single rotor support assembly 30, but after assembling, the first holder member 51 is disengaged from the flange portion 41 away in the axial direction along the sleeve 40, thus allowing the sleeve 40 and the holder 50 to be rotatable via the balls 60.

It is to be noted that even if the disengagement is done, the coaxiality of the holder 50 and the sleeve 40 is kept, so that the axial center of the rotor support assembly 30 is kept equal to the rotational center of the motor.

After assembling, the flange portion 41 works as a fall-off preventing mechanism for the balls 60. Because the holder 50 is fitted to the flange portion 41 at this time, the holder 50 does not contact the flange portion 41 before the balls 60 contact the flange portion 41.

With the rotor 20 supported on the stator 10 by the rotor support assembly 30, the rotor 20 is free in the thrust direction, and the thrust-directional position of the rotor 20 is determined when the motor is completed.

Although the foregoing description has been given of an air-core stepping motor having a rotor and a stator, the rotor support assembly 30 may be used not in a motor but in a structure which has a tubular fixing part and a tubular rotary body arranged coaxial to the fixing part at the outer periphery or inner periphery of the fixing part, as a shaft support structure which supports the rotary body rotatably with respect to the fixing part.

It should be understood by those skilled in the art that various modifications, combinations, sub-combinations and alterations may occur depending on design requirements and other factors insofar as they are within the scope of the appended claims or the equivalents thereof.

What is claimed is:

1. An air-core stepping motor comprising:
a tubular stator including a yoke and a coil;
a tubular rotor including a cylindrical magnet; and
rotor support means for supporting the rotor rotatably with respect to the stator,
the rotor support means including a sleeve fixed to the rotor, a holder fixed to the stator, and a ball held between the sleeve and the holder,
the holder having a first holder member and a second holder member separated in a rotational-axial direction of the motor,
the first holder member and the second holder member being assembled with the first holder member or the second holder member fitted to the sleeve, and being used thereafter with the first holder member or the second holder member disconnected from the sleeve.

2. The air-core stepping motor according to claim 1, wherein ball holding surfaces of the first holder member and the second holder member are tapered surfaces that become wider toward an inside diameter side and face each other, and
the first holder member and the second holder member are fixed with a preload applied in the rotational-axial direction.

3. The air-core stepping motor according to claim 2, wherein the sleeve is provided with a flange portion extending toward an outside diameter,
the flange portion is fitted to the first holder member or the second holder member at a time of coaxial positioning to assemble the first and second holder members and the sleeve, and
after assembling, the fixed first holder member and the second holder member are disengaged from the flange portion in an axial direction.

4. An air-core stepping motor comprising:
a tubular stator including a yoke and a coil, and a housing the yoke and coil accommodated therein;
a tubular rotor including a cylindrical magnet and a cylindrical back yoke, are arranged on an inner periphery side of the stator; and
rotor support means for supporting the rotor rotatably with respect to the stator, the rotor support means including a sleeve fixed in such a way as to extend from both axial-directional end portions of the back yoke of the rotor in an axial direction, and provided with a flange portion extending outward, a holder fixed to both axial-directional end portions of the yoke of the stator, and having a first holder member and a second holder member separated in the axial direction, opposite surfaces of the first holder member and the second holder member being tapered surfaces that become wider toward an inside diameter side and face each other, and a ball held between the sleeve and the both tapered surfaces of the holder, the first holder member and the second holder member being assembled with the first holder member or the second holder member fitted to the sleeve, and being used thereafter with the first holder member or the second holder member disconnected from the sleeve.

5. A shaft support structure comprising:

a tubular fixing part;

a tubular rotary body arranged coaxial to the fixing part on an outer periphery or an inner periphery of the tubular fixing part, and being supported rotatably with respect to the fixing part;

a sleeve fixed to the rotary body;

a holder fixed to the fixing part; and a ball held between the sleeve and the holder, the holder having a first holder member and a second holder member separated in a rotational-axial direction, the first holder member and the second holder member being assembled with the first holder member or the second holder member fitted to the sleeve, and being used thereafter with the first holder member or the second holder member disconnected from the sleeve.

6. An air-core stepping motor comprising:

a tubular stator including a yoke and a coil;

a tubular rotor including a cylindrical magnet; and a rotor support unit configured to support the rotor rotatably with respect to the stator, the rotor support unit including a sleeve fixed to the rotor, a holder fixed to the stator, and a ball held between the sleeve and the holder, the holder having a first holder member and a second holder member separated in a rotational-axial direction of the motor, the first holder member and the second holder member being assembled with the first holder member or the second holder member fitted to the sleeve, and being used thereafter with the first holder member or the second holder member disconnected from the sleeve.

7. An air-core stepping motor comprising:

a tubular stator including a yoke and a coil, and a housing the yoke and coil accommodated therein;

a tubular rotor including a cylindrical magnet and a cylindrical back yoke, are arranged on an inner periphery side of the stator; and a rotor support unit configured to support the rotor rotatably with respect to the stator, the rotor support unit including a sleeve fixed in such a way as to extend from both axial-directional end portions of the back yoke of the rotor in an axial direction, and provided with a flange portion extending outward, a holder fixed to both axial-directional end portions of the yoke of the stator, and having a first holder member and a second holder member separated in the axial direction, opposite surfaces of the first holder member and the second holder member being tapered surfaces that become wider toward an inside diameter side and face each other, and a ball held between the sleeve and the both tapered surfaces of the holder, the first holder member and the second holder member being assembled with the first holder member or the second holder member fitted to the sleeve, and being used thereafter with the first holder member or the second holder member disconnected from the sleeve.

* * * * *